H. HOWSON.
CHAIN.
APPLICATION FILED MAR. 28, 1912.
1,115,431.
Patented Oct. 27, 1914.
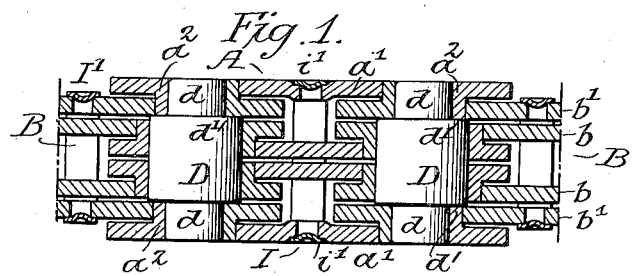
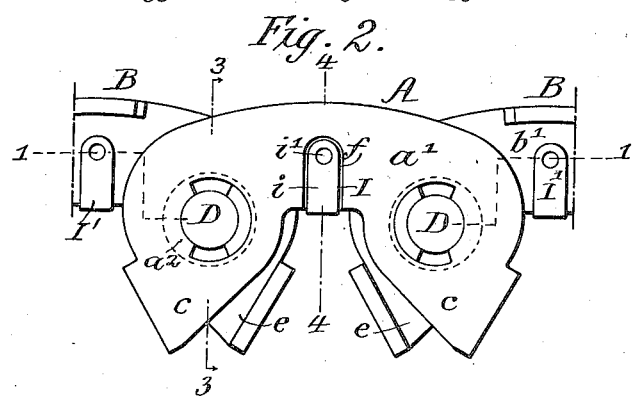
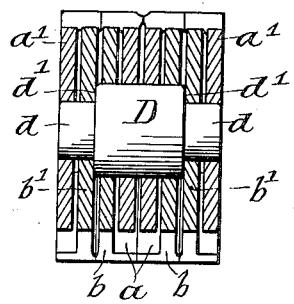
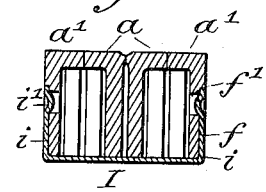
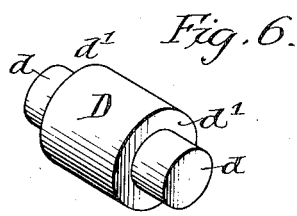
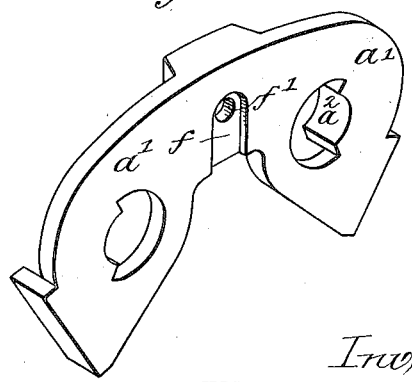
Witnesses—
William H. Rivers.
Willet Burrows.
Inventor—
Henry Howson.
by his Attorneys
Howson and Howson

UNITED STATES PATENT OFFICE.

HENRY HOWSON, OF PHILADELPHIA, PENNSYLVANIA, ASSIGNOR TO LINK-BELT COMPANY, OF CHICAGO, ILLINOIS, A CORPORATION OF ILLINOIS.

CHAIN.

1,115,431.   Specification of Letters Patent.   Patented Oct. 27, 1914.

Application filed March 28, 1912. Serial No. 686,805.

*To all whom it may concern:*

Be it known that I, HENRY HOWSON, a citizen of the United States, residing in Philadelphia, Pennsylvania, have invented certain Improvements in Chains, of which the following is a specification.

This invention relates to certain improvements in chains, particularly in drive chains of the type made of a series of plates and having pivot pins which are free to rotate in the links.

One object of the invention is to provide means for retaining the pivot pins in the plates without the use of devices which would project beyond the sides of the chain.

A further object of the invention is to form the chains so that the clips, which retain the plates of each link, do not extend beyond the sides of the chain.

In the accompanying drawings:—Figure 1, is a sectional plan view on the line 1—1, Fig. 2, illustrating my improved chain; Fig. 2, is a side view of sufficient of a chain to illustrate my invention; Fig. 3, is a transverse sectional view on the line 3—3, Fig. 2; Fig. 4, is a transverse sectional view on the line 4—4, Fig. 2; Fig. 5, is a perspective view of one of the side link plates; and Fig. 6, is a perspective view of one of the pivot pins.

Referring to the drawing, A and B are the links of a chain. The links A are composed of plates $a$, $a'$ and the links B are composed of plates $b$, $b'$. The plates $a$, $a'$ of the links A have teeth $c$ and the plates $b$, $b'$ of the links B have teeth $e$.

D, D are the pivot pins, which pass through openings in the plates of the links A and B and these links have extended bearings for the pivot pins and also have extended bearings at the teeth for the teeth of the sprocket wheels around which they pass, but I lay no claim to the extended bearings of the pivot pins or the extended bearings of the teeth.

Heretofore it has been the practice in this type of chains to have the pivot pins of an even diameter throughout, and to provide means for retaining the pivot pins against longitudinal movement in the links, but this necessitated a projection on the chain beyond the ends of the pivot pins.

By my invention the diameter of the pivot pin is reduced at each end $d$, as shown in Fig. 1, forming shoulders $d'$, as clearly shown in Fig. 6. The openings in the link plates $a$ and $b$ are of such a diameter that the body portion of the link D will snugly fit therein while the link plates $a'$ and $b'$ at each side of the chain are of such a diameter as to snugly fit the reduced portions $d$ of the pin D. The link plates $b'$ and the extended bearing $a^2$ of the plates $a'$ rest against the shoulders $d'$ of the pivot pin; thus retaining the pivot pin against longitudinal movement in the links, yet allowing the pins to freely turn.

In order to hold the plates of each link in position, I provide clips which extend through openings between the teeth of the links and which bear upon the outside link plates. I lay no claim broadly to the location of the clips at this point, nor to the form of the clips.

I, I are the clips which retain the plates $a$, $a'$ of the link A in place, and the outside plates $a'$ are recessed at $f$ to receive the end sections $i$ of the clips. The plates are preferably perforated at $f'$ to receive the projection $i'$ of the clip. The depression $f$ is such that the clip does not extend beyond the face of the side plate $a'$, as clearly shown in Figs. 1 and 4.

I', I' are the clips which secure the plates $b$, $b'$ of the link B in place. The outside plates $b'$ of the links B need not be recessed as the plates $a'$ of the links A protect them. In some instances, the clips I' may be dispensed with as the clips I, secured to the alternate links, will hold the plates of the links B laterally in position. Thus it will be seen by the above construction that there is no projection beyond the link plates $a'$ of the chain. Consequently, there is no lateral wear except on the side link plates $a$, $a'$.

It will be understood that the links A and B may be composed of any number of plates $a$ and $b$, according to the width of the chain desired.

While I have illustrated the invention as applied to a chain having teeth; these teeth may be modified or dispensed with entirely in some instances. The invention may also be used in connection with a chain in which extended bearings are omitted.

I claim:—

1. The combination of a series of sets of toothed plates, each set forming the link of a chain; each plate having two openings spaced apart; pivot pins mounted in the openings and coupling the links together;

the pivot pins being reduced at each end to form shoulders; the outside plates of each link having openings less in diameter than those at the center of the links so as to fit the reduced portions of the pivot pins; the outside plates of each alternate link being recessed; and clips extending through the space between the teeth of said link and having portions extending into the recesses, whereby the plates are held together and the outer surface of the clip is flush with the outer surface of the outside plates.

2. The combination of a series of sets of plates, each set forming the link of a chain; each plate having two openings; pivot pins extending through the openings and connecting one set of plates to another; the outside plates of alternate links being recessed; and clips extending across the links and having end sections, each entire end section being located in the recess in one of the end plates so that the outer surface of the end section will be flush with the outer surface of the outside plate.

In testimony whereof, I have signed my name to this specification, in the presence of two subscribing witnesses.

HENRY HOWSON.

Witnesses:
Wm. E. Shupe,
Wm. A. Barr.